Feb. 3, 1931.   J. G. PAULIN   1,791,246
INSTRUMENT FOR MEASURING VARIABLE FORCES
Filed Sept. 28, 1928

Patented Feb. 3, 1931

1,791,246

UNITED STATES PATENT OFFICE

JOSUA GABRIEL PAULIN, OF ESKILSTUNA, SWEDEN

INSTRUMENT FOR MEASURING VARIABLE FORCES

Application filed September 28, 1928. Serial No. 308,915.

The present invention relates to instruments for measuring and registering variable forces, such as the pressure of gases or liquids or the like, in accordance with the zero method. In such instruments the forces to be measured are counteracted by a spring the tension of which can be adjusted for compensating said forces. For the adjustment of the spring there is provided a zero-setting device by which the movable measuring member actuated by the forces can be brought back into a certain middle or zero position in which the forces are compensated and which is indicated by means of a zero pointer geared to the measuring member. The value of the total shifting of the zero setting device from a certain starting position will then evidently form a measure of the compensated pressure or the like, which can be read off by means of a pointer or any indicator connected with the zero setting device.

The object of the invention is to so construct the zero-setting device that the pointer which indicates the value of the pressure or the like to be measured, will be automatically stopped exactly in the position which corresponds to the zero position of the measuring member. For this purpose, according to one feature of the invention, the said pointer is arranged to be operated by a locking device operating under the control of the measuring member so as to cause the pointer to be automatically locked in a position corresponding to the zero position of the measuring member upon the measuring member passing through its zero position. According to another feature of the invention the said pointer is operated by the zero-setting device so as to perform an oscillating movement while being moved positively in one direction and caused to follow the movement of the zero-setting device in the other direction under the influence of a comparatively weak counter-force, for instance its own weight, the locking of the pointer taking place while the pointer is moving in the direction last mentioned.

Figure 1:
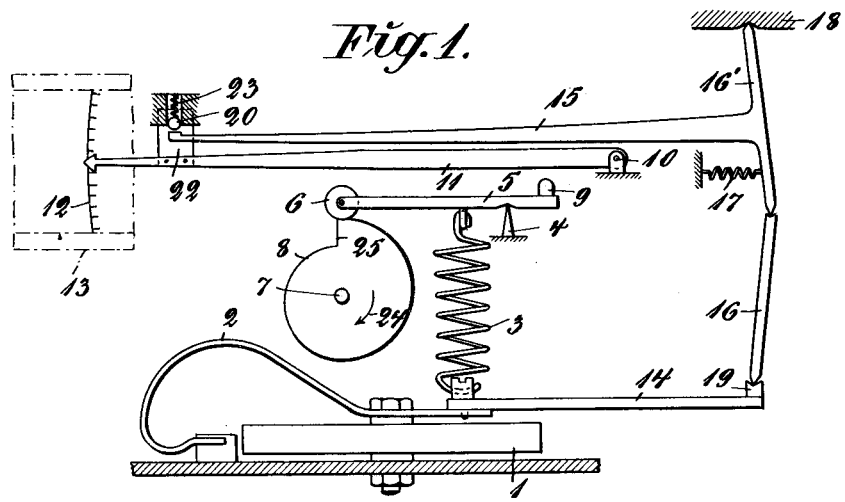
Figure 2:
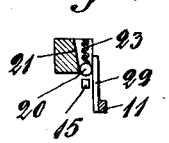
Figure 3:
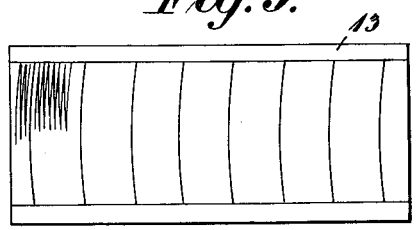
Figure 4:
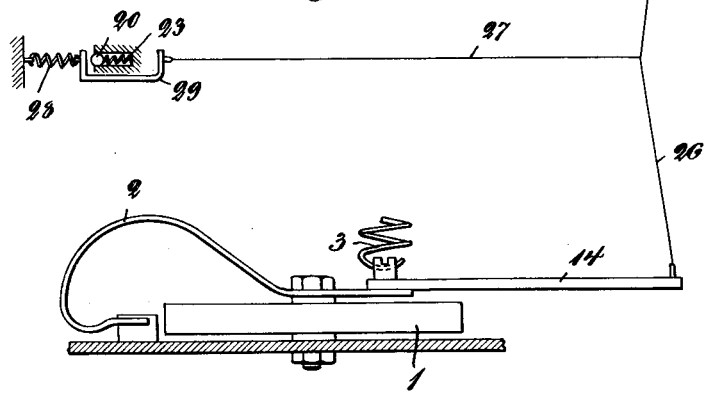

The invention will be more closely described with reference to the accompanying drawing which shows an embodiment of the invention. Figure 1 is a diagrammatical side elevation of an embodiment of the invention as applied to an aneroid barometer. Figure 2 is a detail of the frictional detent. Figure 3 shows a registration of pressure variations by means of the aneroid barometer according to Figure 1. Figure 4 shows a modification of the gearing between the diaphragm box and the zero pointer.

The measuring member of the aneroid barometer according to Figure 1 consists as usual of a diaphragm box 1 secured to the frame of the instrument. The external air pressure acting upon the diaphragm is compensated by a bent over leaf spring 2, the one end of which is secured to the frame whereas its other end is connected to the diaphragm at the upper side of the box and also by a helical spring 3, the one end of which is connected to the free end of the leaf spring and the other end of which is connected to the one arm of a lever 5 pivoted on an edge 4. The outer end of the lever arm is provided with a roller 6, which is actuated by the spring pressure and bears against the spiral-shaped edge of a cam disc 8 which is secured to a rotatable shaft 7. The shorter arm of the lever 5 is provided with an upward projection 9 which normally bears against an arm 11 pivoted at 10, the extreme point of which is passing over a scale 12. If desired, the free end of the pointer 11 can be provided with registering points in which case the scale 12 is substituted by a registering slip 13, Figure 3, which is fed continuously, perpendicularly to the path of the pointer. The free end of the leaf-spring 2 is provided with an extension 14 by means of which the movements of the diaphragm are amplified and transmitted to a zero pointer 15 through the intermedium of a motion amplifying gearing. The gearing consists in the embodiment shown on Figure 1 of two jointed links or rods 16, 16' which are held in an obtuse angle in relation to each other against the action of a spring 17 acting on the rod 16'. The latter is braced between a fixed groove 18 and a movable groove 19 disposed on the outer end of the extension 14. The zero pointer 15 is rigidly connected to the upper rod 16.

The zero pointer is adapted to hold normally a frictional locking device in inoperative position said locking device cooperating with the pointer 11. The frictional locking device consists in the shown embodiment of a small metal ball 20 which bears against a fixed sloping plane 21 in the supporting frame behind a vertical plate 22 which is connected to the pointer 11. The ball is actuated by a soft helical spring 23 which tends to push the ball against the projecting lower edge of the sloping plane in which position the ball is squeezed between the sloping plane and the plate 22 and thus locks the pointer 11 in the position which it is then occupying.

So long as the zero pointer 15 makes an upward deflection counted from its zero position its free end bears against the ball 20 and pushes the ball upward against the action of the spring 23, the pressure of the ball against the plate 22 being then relieved. The pointer 11 thus rests freely on the projection 9 and can follow the movement of the latter when rotating the cam disc 8.

The cam disc 8 is rotatable in the direction of the arrow 24. The cam disc can be turned continuously by means of a clock work or the like or it may be adapted to be rotated manually one turn for each reading of the instrument.

In the position of the movable parts as shown on the drawing the roller 6 of the lever 5 bears against the uppermost point of the cam disc 8 the helical spring 3 having then its maximum tension. The diaphragm in the diaphragm box 1 is actuated by this tension and deflected upwards. This results in that the elbow formed by the rods 16, 16' is bent to the right against the action of the spring 17 and the zero pointer 15 takes up a swung down position and is thus brought out of engagement with the ball 20 which latter then is in a projected position and in frictional engagement with the plate 22, the pointer 11 thus being held in its position. When the roller 6 at the rotation of the cam disc 24 drops down along the abrupt part 25 of the cam disc, the tension of the spring 3 is instantly reduced to a minimum and the diaphragm bends downwards. The elbow 16, 16' is nearly straightened out being actuated by the spring 17. The zero pointer 15 is then swung against the ball 20 and presses it upwards against the action of the spring 23 and releases the pointer 11 which then is swung upwards by the projection 9 to its uppermost position. When the cam disc continues its rotation in the direction of the arrow the spring is stretched by degrees at the same time as the projection 9 is lowered, the pointer 11 freely following the motion on account of its own weight. At the same time the elbow formed by the rods 16, 16' is successively bent out and the zero pointer 15 is lowered and the ball 20 is pushed by the spring 23 against the lower edge of the sloping plane 21. In that moment during the rotation of the cam disc, when the diaphragm takes up its middle position and thus the zero pointer 15 is in its zero position, the ball 20 is just attaining its lowermost position and enters into frictional engagement with the plate 22, the pointer 11 being then retained in the corresponding position. The movement of the pointer 11 from its uppermost position is thus a measure of the tension of the spring 3 and indicates the external barometric pressure which latter is exactly compensated by the spring tension attained in that moment when the zero pointer or the diaphragm respectively is passing its middle position and the pointer 11 is locked. The pointer 11 stops once for each turn of the cam disc 24 in a position corresponding to the prevailing barometric pressure and indicates the pressure on the scale 12.

If the pointer 11 is provided with a registering point and adapted to register the pressure on a continuously fed registering slip 13 the registering point will describe a zig-zag line on the registering slip of the appearance shown in Figure 3. The upper turning points of the zig-zag line lie all on the same height corresponding to the uppermost position of the pointer 11. The lower turning points of the curve correspond to those points in which the pointer 11 stops, when the pointer is locked and they lie accordingly so much the lower the higher the barometric pressure is at that time.

In the embodiment according to Figure 2 the gearing consisting of the rods 16, 16' in Figure 1 is substituted by a band system consisting of a flexible band 26 stretched between the extension 14 and a fixed point in the supporting frame to which a horizontal band 27 is joined approximately at the middle of the former band. The band 27 is connected to a yoke 29 actuated by a spring 28. The band 26 is stretched by the spring 28 so as to form an angle. The yoke 29 which corresponds to the zero pointer 15 in the above described embodiment is adapted to actuate the locking ball 20 in a similar manner as the zero pointer 15 in Figure 1 the ball being adapted to operate in a frictional locking device of the same kind as that described in connection with Figure 1. Also otherwise the device may be analogous with the above described.

I claim:

1. An instrument for measuring variable forces comprising a measuring member operating under the influence of the forces to be measured, an adjustable device for producing a counter-force to compensate said forces on the measuring member, means for setting said compensating device, an indicating device for indicating the value of the compensating force said indicating device being arranged to follow the movement of said setting device, and means under the control of the measuring member for automatically stopping the movement of said indicating device in a certain middle position of the measuring member independently of the setting movement of said setting device.

2. An instrument for measuring variable forces, comprising a measuring member operating under the influence of the forces to be measured, an adjustable device for producing a counter-force to compensate the forces acting on said measuring member, means for setting said compensating device so as to vary the value of said counter-force between two predetermined limits, an indicating device for indicating the value of said compensating force, said indicating device being arranged to follow the movement of said setting device, and locking means under the control of said measuring member for automatically stopping the movement of said indicating device in a certain middle position of said measuring member independently of the setting movement of said setting device.

3. An instrument for measuring variable forces, comprising a measuring member operating under the influence of the forces to be measured, an adjustable device for producing a counter-force to compensate the forces acting on said measuring member, means for setting said compensating device periodically so as to vary the value of said counter-force repeatedly between two predetermined limits, an indicating device for indicating the value of said compensating force, said indicating device being arranged to follow the movement of said setting device, and locking means under the control of said measuring member for automatically stopping the movement of said indicating device in a certain middle position of said measuring member independently of the setting movement of said setting device.

4. An instrument for measuring variable forces, comprising a measuring member operating under the influence of the forces to be measured, a counter-spring connected at one end to said measuring member, an adjusting member connected to the other end of said counter-spring, means for displacing said adjusting member so as to vary the tension of said counter-spring, an indicating device for indicating the value of the tension of said counter-spring, said indicating device being arranged to follow the displacements of said adjusting member, and means under the control of said measuring member for automatically stopping the movement of said indicating device in a certain middle position of said measuring member independently of the movement of said adjusting member.

5. An instrument for measuring variable forces, comprising a measuring member operating under the influence of the forces to be measured, a counter-spring connected at one end to said measuring member, an adjustable lever connected to the other end of said counter-spring, means for imparting a reciprocating movement to said adjusting lever, an indicating arm for indicating the value of the tension of said counter-spring, said indicating arm being arranged to follow the movement of said adjusting lever, and means under the control of said measuring member for automatically stopping the movement of said indicating arm in a certain middle position of said measuring member independently of the adjusting movement of said adjusting lever.

6. An instrument for measuring variable forces, comprising a measuring member operating under the influence of the forces to be measured, a zero pointer, a linkage connecting said zero pointer with said measuring member, an adjustable device for producing a counter-force to compensate the forces acting on said measuring member, means for setting said compensating device, an indicating device for indicating the value of said compensating force, said indicating device being arranged to follow the movement of said setting device, and locking means under the control of said zero pointer for automatically stopping the movement of said indicating device in a certain middle position of said measuring member independently of the setting movement of said setting device.

7. An instrument according to claim 6, including a linkage comprising an angularly bent deformable member inserted between parts of the instrument which are movable relatively to each other under the influence of the forces to be measured, said deformable member being connected with the zero pointer so as to deflect the zero pointer upon the said member being deformed.

8. An instrument according to claim 6, including a linkage comprising two rigid jointed rods disposed at an angle to each other between parts of the instrument which are movable relatively of each other under the influence of the forces to be measured, and a biasing spring connected to said rods exerting a force tending to straighten out the latter, one of said rods being connected to the zero pointer.

In testimony whereof I affix my signature.

JOSUA GABRIEL PAULIN.